US011892974B2

(12) United States Patent
Shono

(10) Patent No.: US 11,892,974 B2
(45) Date of Patent: Feb. 6, 2024

(54) FILE MANAGEMENT PROGRAM AND FILE MANAGEMENT SYSTEM, FOR OUTPUTTING TARGET FILE, AND INFORMATION FILE CONTAINING INFORMATION LINKED WITH TARGET FILE, TO EXTERNAL DEVICE

(71) Applicant: KYOCERA Document Solutions Inc., Osaka (JP)

(72) Inventor: Koichi Shono, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/088,524

(22) Filed: Dec. 24, 2022

(65) Prior Publication Data
US 2023/0205731 A1 Jun. 29, 2023

(30) Foreign Application Priority Data
Dec. 27, 2021 (JP) .................... 2021-211987

(51) Int. Cl.
G06F 16/00 (2019.01)
G06F 16/11 (2019.01)
G06F 16/174 (2019.01)
G06F 7/14 (2006.01)
G06F 16/16 (2019.01)

(52) U.S. Cl.
CPC .............. *G06F 16/116* (2019.01); *G06F 7/14* (2013.01); *G06F 16/16* (2019.01); *G06F 16/1744* (2019.01)

(58) Field of Classification Search
None
See application file for complete search history.

(56) References Cited

U.S. PATENT DOCUMENTS

| 11,151,660 | B1* | 10/2021 | Harding ............... G06Q 40/08 |
| 2013/0262413 | A1* | 10/2013 | Miyata .................... G06F 3/033 |
| | | | 707/693 |
| 2018/0336406 | A1 | 11/2018 | Shimazaki | |

FOREIGN PATENT DOCUMENTS

JP 2018195054 A 12/2018

* cited by examiner

*Primary Examiner* — Tuankhanh D Phan
(74) *Attorney, Agent, or Firm* — IP Business Solutions, LLC

(57) ABSTRACT

A file management system includes a communication device and a control device. The control device acts as a file manager, a file outputter, an information file generator, and a file merger. The file manager manages various files. The file outputter outputs a file based on a target file among the various files, to outside of the computer via the communication device. The information file generator generates an information file which is a document file containing information linked with the target file. The file merger generates a merged target file, by merging the information file with the target file, when the target file is of a specific file format. The file outputter outputs, when the file merger generates the merged target file, the merged target file to outside of the computer via the communication device, as the file based on the target file.

10 Claims, 15 Drawing Sheets

Fig.3

| TASK NAME | TASK TYPE | STATUS | EXECUTER/ APPROVER | COMMENT | TIME |
|---|---|---|---|---|---|
| START WORKFLOW | START | FINISHED | A | | FEB. 03, 2021 10:08:24 |
| CONFIRM INVOICE | TASK | FINISHED | B | INVOICE AMOUNT CONFIRMED | FEB. 03, 2021 17:01:42 |
| APPROVE INVOICE | APPROVE | FINISHED | C | APPROVED | FEB. 05, 2021 13:54:19 |
| FEEDBACK | FEEDBACK | FINISHED | A | | FEB. 05, 2021 13:58:33 |

| DOCUMENT CLASS | INVOICE |
|---|---|
| DISPLAY NAME | Invoice.docx |
| WORKFLOW STATUS | FINISHED |
| COMPANY NAME | Kyacee |
| PRODUCT NAME | Kyacee Content Manager |
| CREDITOR NAME | Taro Kyacee |
| CREDITOR ID | 1234 |
| TOTAL | 1000000 |

| DOCUMENT CLASS | PROPERTY INFORMATION OTHER THAN DOCUMENT CLASS |
|---|---|
| INVOICE | DISPLAY NAME, WORKFLOW STATUS, COMPANY NAME, PRODUCT NAME, CREDITOR NAME, CREDITOR ID, TOTAL |
| . . . | . . . |

24G

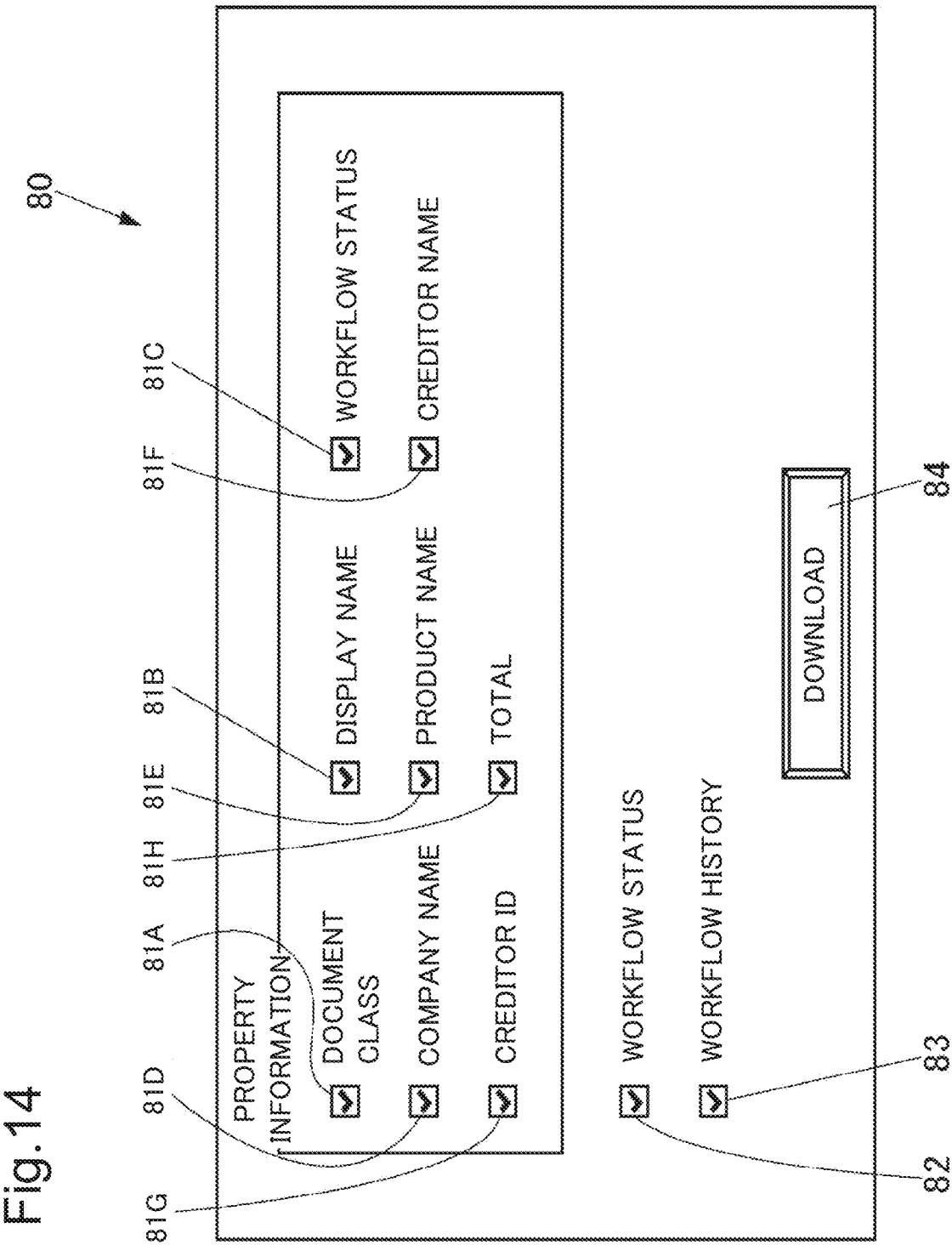

PROPERTY INFORMATION (151)

| DOCUMENT CLASS | INVOICE |
|---|---|
| DISPLAY NAME | Invoice.docx |
| WORKFLOW STATUS | FINISHED |
| COMPANY NAME | Kyacee |
| PRODUCT NAME | Kyacee Content Manager |
| CREDITOR NAME | Taro Kyacee |
| CREDITOR ID | 1234 |
| TOTAL | 1000000 |

WORKFLOW STATUS (152)

| FINISHED |
|---|

WORKFLOW HISTORY (153)

| TASK NAME | TASK TYPE | STATUS | EXECUTER/ APPROVER | COMMENT | TIME |
|---|---|---|---|---|---|
| START WORKFLOW | START | FINISHED | A | | FEB. 03, 2021 10:08:24 |
| CONFIRM INVOICE | TASK | FINISHED | B | INVOICE AMOUNT CONFIRMED | FEB. 03, 2021 17:01:42 |
| APPROVE INVOICE | APPROVE | FINISHED | C | APPROVE | FEB. 05, 2021 13:54:19 |
| FEEDBACK | FEEDBACK | FINISHED | A | | FEB. 05, 2021 13:58:33 |

FILE MANAGEMENT PROGRAM AND FILE MANAGEMENT SYSTEM, FOR OUTPUTTING TARGET FILE, AND INFORMATION FILE CONTAINING INFORMATION LINKED WITH TARGET FILE, TO EXTERNAL DEVICE

INCORPORATION BY REFERENCE

This application claims priority to Japanese Patent Application No. 2021-211987 filed on Dec. 27, 2021, the entire contents of which are incorporated by reference herein.

BACKGROUND

The present disclosure relates to a file management program and a file management system, for managing various files.

An enterprise contents management (ECM) is known as a system for managing various files, such as document files. The ECM has a function of generating a workflow about the file being managed. With the workflow, confirmation and approval of the file content can be executed in the ECM. For example, an evidence indicating that the file content has been confirmed, and an evidence indicating that the file content has been approved, can be recorded in the ECM.

However, there are cases where the document has to be stored outside of the ECM, depending on the type of the document. For example, when the document is an International Organization for Standardization (ISO) document, the document may have to be stored, after the content of the document is approved according to the workflow in the ECM, in a system outside of the ECM, designated by the company regulations, together with the evidence showing that the document has been approved. In the case of the document that has to be managed as above, the ECM has to have a function of, for example, outputting the status of the workflow, such as the approval status of the document in question, to outside of the ECM.

A document management system, capable of outputting a document file to outside, is known. When outputting a single document file to outside, such a document management system outputs to outside a download folder, made up as a compressed folder formed by compressing the document file and a download summary, which is a file indicating that the document in the document file has been approved, into a single ZIP folder. When outputting a plurality of document files to outside, the document management system outputs to outside a download folder, made up as a compressed folder formed by compressing the plurality of document files and a download summary, which is a file indicating that the document in each of the document files has been approved, into a single ZIP folder.

SUMMARY

The disclosure proposes further improvement of the foregoing techniques.

In an aspect, the disclosure provides a computer-readable, non-transitory recording medium having a file management program stored therein. The file management program is configured to cause a computer including a communication device that communicates with an external device and a processor, to act as a file manager, a file outputter, an information file generator, and a file merger, when the processor executes the file management program. The file manager manages various files. The file outputter outputs a file based on a target file among the various files, to outside of the computer via the communication device. The information file generator generates an information file which is a document file containing information linked with the target file. The file merger generates a merged target file, by merging the information file with the target file, when the target file is of a specific file format. The file outputter outputs the merged target file to outside of the computer via the communication device, as the file based on the target file, when the file merger generates the merged target file.

In another aspect, the disclosure provides a file management system including a communication device and a control device. The communication device communicates with an external device. The control device includes a processor, and acts as a file manager, a file outputter, an information file generator, and a file merger, when the processor executes a control program. The file manager manages various files. The file outputter outputs a file based on a target file among the various files, to outside of the computer via the communication device. The information file generator generates an information file which is a document file containing information linked with the target file. The file merger generates a merged target file, by merging the information file with the target file, when the target file is of a specific file format. The file outputter outputs the merged target file to outside of the computer via the communication device, as the file based on the target file, when the file merger generates the merged target file.

BRIEF DESCRIPTION OF THE DRAWINGS

FIG. 3 is a table showing an example of a workflow history;

FIG. 5 is a table showing an example of property information;

FIG. 6 is a table showing an example of property information setting information;

FIG. 14 is a schematic drawing showing an example of an information selection screen; and FIG. 15 is a schematic drawing showing an example of a document included in an information file.

DETAILED DESCRIPTION

Figure 1:
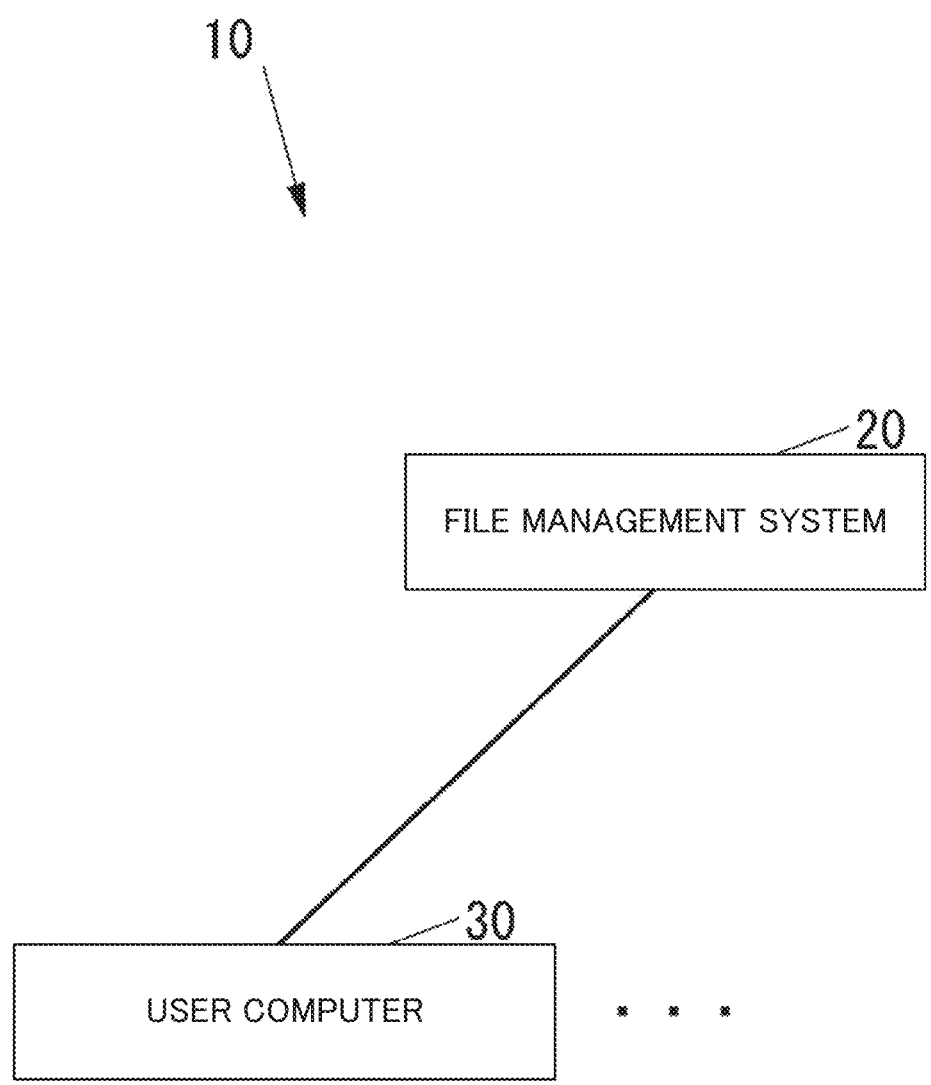
FIG. 1 is a block diagram showing a system according to an embodiment of the disclosure.

Hereafter, an embodiment of the disclosure will be described, with reference to the drawings. First, a configuration of a system according to the embodiment of the disclosure will be described. FIG. 1 is a block diagram showing the system 10 according to the embodiment. As shown in FIG. 1, the system 10 includes a file management system 20, set up as an ECM that manages various files, and a computer used by the user of the file management system 20 (hereinafter, "user computer") 30.

The system 10 may include at least another user computer configured similarly to the user computer 30, in addition thereto. The file management system 20 may be constituted of a single computer such as a personal computer (PC), or a plurality of computers. The user computer 30 may be, for example, constituted of a PC.

Figure 2:
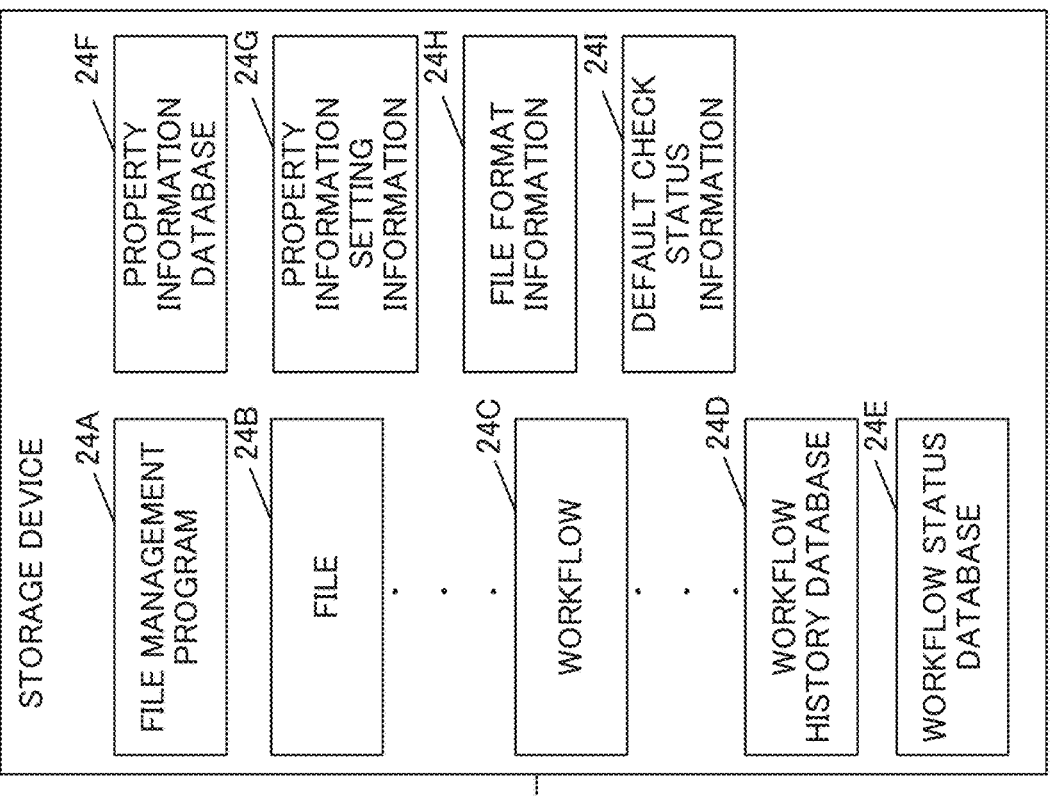
FIG. 2 is a block diagram showing a configuration of a file management system.
Figure 2:
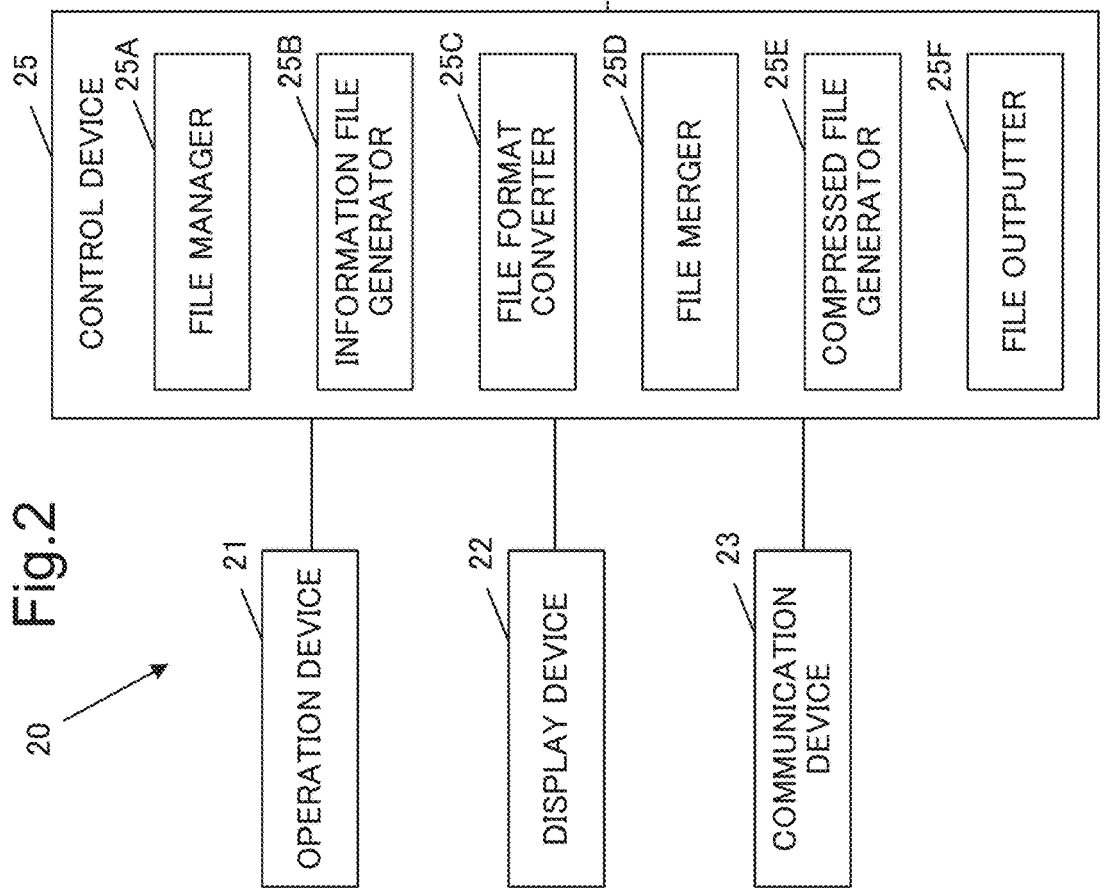

FIG. 2 is a block diagram showing a configuration of the file management system 20. It will hereinafter be assumed that the file management system 20 includes a single computer. As shown in FIG. 2, the file management system 20 includes an operation device 21, a display device 22, a communication device 23, a storage device 24, and a control device 25.

The operation device 21 includes, for example, a keyboard and a mouse, with which various instructions can be inputted. The display device 22 includes, for example, a liquid crystal display (LCD) that displays various types of information. The communication device 23 performs communication with an external device via a network such as a local area network (LAN) or the internet, or wired or wireless direct communication, without utilizing the network. The storage device 24 is constituted of, for example, a non-volatile memory such as a semiconductor memory or a hard disk drive (HDD), for storing various types of information. The control device 25 controls the overall operation of the file management system 20.

The storage device 24 contains a file management program 24A for managing various files. The file management program 24A may be installed in the file management system 20, for example during the manufacturing process of the file management system 20. Instead, the file management program 24A may be additionally installed from an external storage medium such as a universal serial bus (USB) memory, or from a network.

A file 24B, being managed by a file manager 25A to be subsequently described, can be stored in the storage device 24. In addition, a plurality of files managed by the file manager 25A, other than the file 24B, can also be stored in the storage device 24. Examples of the files managed by the file manager 25A include various document files such as a file based on Microsoft (registered trademark) Word, a file based on Microsoft Excel (registered trademark), and a file in the portable document format (PDF). Examples of the files managed by the file manager 25A further include various files, such as a compressed file including a ZIP file, and a movie file in the MP4 format.

A workflow 24C, generated with respect to the file being managed by the file manager 25A, can be stored in the storage device 24. In addition, a plurality of workflows, other than the workflow 24C, with respect to the files being managed by the file manager 25A, can also be stored in the storage device 24. Here, the file manager 25A is restricted from associating a plurality of workflows at the same time, with each of the files being managed by the file manager 25A.

The storage device 24 contains a workflow history database 24D. The workflow history database 24D is for managing a history of the workflow generated with respect to the file being managed by the file manager 25A (hereinafter, "workflow history").

FIG. 3 illustrates an example of the workflow history 300. As shown in FIG. 3, the workflow history 300 represents "task name" indicating the task constituting the workflow, "task type" indicating the type of the task, "status" of the task, "executer/approver" indicating the executer or approver of the task, "comment" inputted by the executer or approver of the task, and "time" indicating the date and time that the task has turned to the finished status, with respect to each of the tasks.

Here, "feedback" included in the task type indicates the task of final confirmation with respect to the workflow, by the user who started the workflow. Accordingly, in a strict sense, the feedback is not the task in the corresponding workflow.

As shown in FIG. 2, the storage device 24 contains a workflow status database 24E. The workflow status database 24E is for managing the status of the workflow generated with respect to the file being managed by the file manager 25A (hereinafter, "workflow status").

Figure 4:
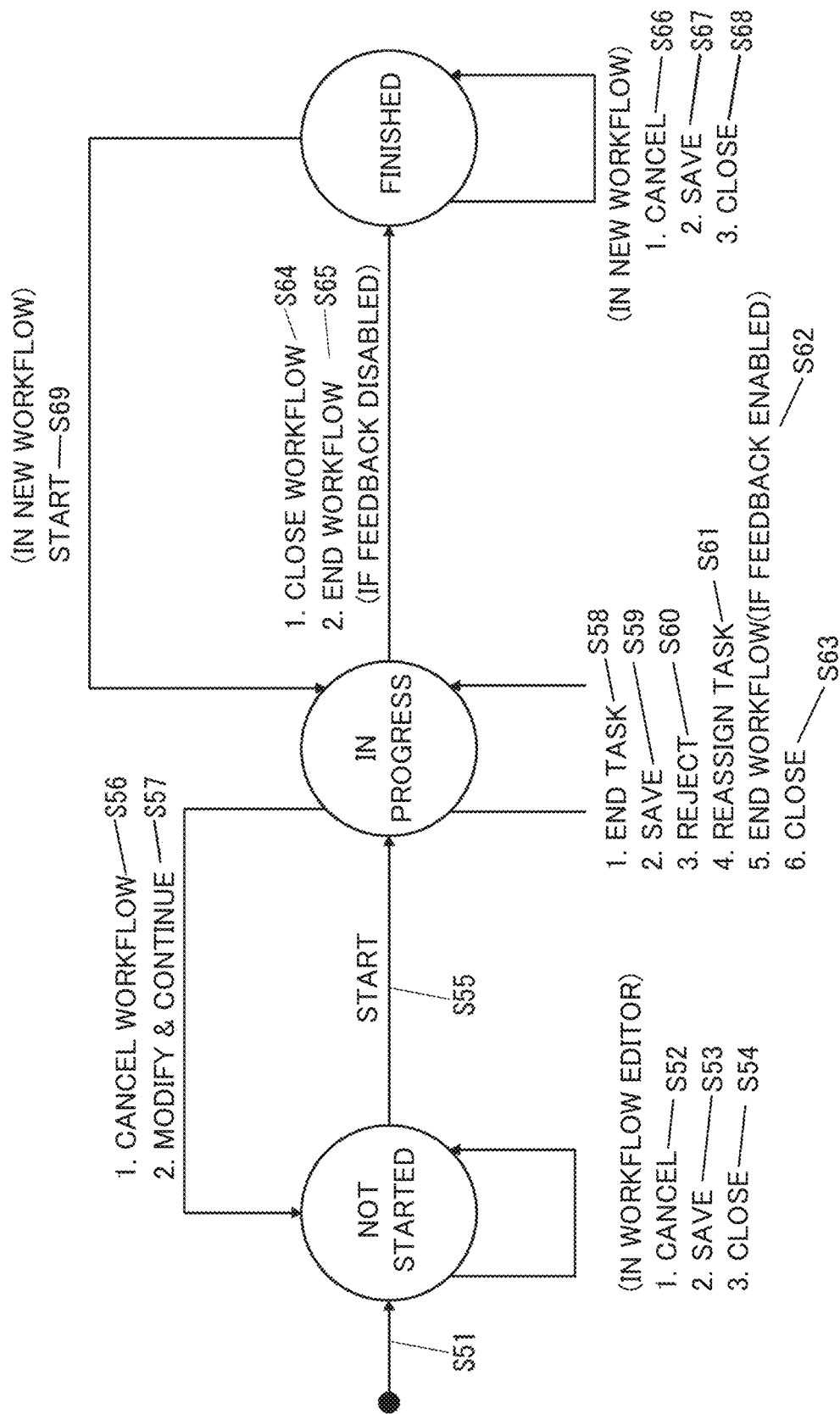
FIG. 4 is a diagram showing transitions of workflow status.

FIG. 4 illustrates transitions of the workflow status. As shown in FIG. 4, the phases of the workflow status include "not started" indicating that the workflow has not yet been started up, "in progress" indicating that the workflow has been started up and is in progress, and "finished" indicating that the workflow has finished.

"In progress" in the workflow status actually indicates the current task, in such a format as "in progress (current task name)". For example, when the name of the current task is "start workflow", in the state where the workflow has been started up and is in progress, the workflow status is indicated as "in progress (start workflow)".

Referring to FIG. 4, when the generation of the workflow is first started with respect to a target file, the file manager 25A causes the workflow status associated with the target file to make transition to "not started" (step S51). Although the generation of the workflow currently being generated is cancelled, when the workflow status is "not started", the file manager 25A maintains "not started" as the workflow status associated with the target file (step S52).

Although the workflow currently being generated is temporarily saved, when the workflow status is "not started", the file manager 25A maintains "not started" as the workflow status associated with the target file (step S53). Although the generation of the workflow is finished, without the workflow currently being generated having been saved, when the workflow status is "not started", the file manager 25A maintains "not started" as the workflow status associated with the target file (step S54).

When the workflow generated with respect to the target file starts to be executed, in the state where the workflow status is "not started", the file manager 25A causes the workflow status associated with the target file to make transition to "in progress" (step S55). When the execution of the workflow currently being executed is cancelled, in the state where the workflow status is "in progress", the file manager 25A causes the workflow status associated with the target file to make transition to "not started" (step S56).

When the workflow currently being executed is revised, in the state where the workflow status is "in progress", the file manager 25A causes the workflow status associated with the target file to make transition to "not started" (step S57). Although the task in the workflow currently being executed is finished, when the workflow status is "in progress", the file manager 25A maintains "in progress" as the workflow status associated with the target file (step S58).

Although a comment inputted by the executer or approver of the task is saved in the workflow currently being executed, when the workflow status is "in progress", the file manager 25A maintains "in progress" as the workflow status associated with the target file (step S59). For example, although an action of approval is rejected in the workflow currently being executed, when the workflow status is "in progress", the file manager 25A maintains "in progress" as the workflow status associated with the target file (step S60).

Although the task in the workflow currently being executed is again executed, when the workflow status is "in progress", the file manager 25A maintains "in progress" as the workflow status associated with the target file (step S61). When the task of feedback is present with respect to the workflow currently being executed, in the state where the workflow status is "in progress", the file manager 25A maintains "in progress" as the workflow status associated with the target file, although the workflow currently being executed is finished, because the task of feedback still remains (step S62).

Although the saving of the comment inputted by the executer or approver of the task is cancelled in the workflow currently being executed, when the workflow status is "in progress", the file manager 25A maintains "in progress" as the workflow status associated with the target file (step S63). When the workflow currently being executed is forcibly finished, in the state where the workflow status is "in progress", the file manager 25A causes the workflow status associated with the target file to make transition to "finished" (step S64).

In the case where the task of feedback is non-existent with respect to the workflow currently being executed, in the state where the workflow status is "in progress", the file manager 25A causes the workflow status associated with the target file to make transition to "finished", when the workflow currently being executed is finished (step S65). Although the generation of the workflow, being newly generated with respect to the target file, is cancelled, when the workflow status is "finished", the file manager 25A maintains "finished" as the workflow status associated with the target file (step S66).

Although the workflow being newly generated with respect to the target file is temporarily saved, when the workflow status is "finished", the file manager 25A maintains "finished" as the workflow status associated with the target file (step S67). Although the generation of the workflow is finished, without the workflow being newly generated with respect to the target file having been saved, when the workflow status is "finished", the file manager 25A maintains "finished" as the workflow status associated with the target file (step S68).

When the execution of the workflow newly generated with respect to the target file is started, in the state where the workflow status is "finished", the file manager 25A causes the workflow status associated with the target file to make transition to "in progress" (step S69).

As shown in FIG. 2, the storage device 24 contains a property information database 24F. The property information database 24F is for managing the property information of the files being managed by the file manager 25A. FIG. 5 illustrates an example of property information 500. The property information 500 exemplifies the property information of a file, the document class of which is Invoice. As shown in FIG. 5, the property information 500 contains "document class" indicating the type of the document, when the file is a document file. Examples of the type of the document include the Invoice, a pamphlet, and various other documents.

The property information 500 contains "display name" indicating the name of the file in the file management system 20, the "workflow status", "Company Name" indicating the customer on the Invoice, "Product Name" indicating the merchandise supplied, "Creditor Name" indicating the person in charge of payment, "Creditor ID" indicating the ID of the creditor, and "Total" indicating the total amount of the merchandise. Here, "display name", "Company Name", "ProductName", "Creditor Name", "Creditor ID" and "Total" are the information for which the user can specify the value (hereinafter, "user-settable information"). The "workflow status" is the information for which the user is unable to specify the value (hereinafter, "user-unsettable information").

As shown in FIG. 2, the storage device 24 contains property information setting information 24G, indicating the type of the information included in the property information. FIG. 6 illustrates an example of the property information setting information 24G. As shown in FIG. 6, the property information setting information 24G indicates the type of the information included in the property, with respect to each of the document classes. For example, the manager, among the users of the file management system 20, can specify the property information about each of the document classes in the property information setting information 24G, via the manager's own user computer.

As shown in FIG. 2, the storage device 24 contains file format information 24H. The file format information 24H indicates the file format of a file being managed by the file manager 25A, to which information linked with that file (hereinafter, "file information") has been added (hereinafter, "information-added file"). The file information contains workflow information including the workflow status and the workflow history, and the property information of the file.

Various file formats can be specified in the file format information 24H, for example PDF. Examples of the user who can specify the file format in the file format information 24H include the manager of the file management system 20, and general users of the file management system 20. The following description is based on the assumption that the file format indicated by the file format information 24H is PDF.

The storage device 24 contains default check status information 24I. The default check status information 24I indicates, with respect to each of the document classes, the status of default check for a checkbox on an information selection screen for selecting the file information to be added to the file. The default setting in the default check status information 24I is the state where all the checkboxes on the information selection screen are checked. Examples of the user who can edit the default check status information 24I include the manager of the file management system 20, and general users of the file management system 20.

The control device 25 includes, for example, a central processing unit (CPU), a read-only memory (ROM) containing programs and various types of data, and a random-access memory (RAM) serving as the operation region for the CPU of the control device 25. The CPU of the control device 25 executes the programs stored in the storage device 24 or the ROM of the control device 25.

The control device 25 realizes the file manager 25A, an information file generator 25B, a file format converter 25C, a file merger 25D, a compressed file generator 25E, and a file outputter 25F, by executing the file management program 24A. The file manager 25A manages various files. The file manager 25A also acts as a web server. The information file generator 25B generates an information file which is a document file containing information linked with the target file, among the files being managed by the file manager 25A. The file merger. The file outputter outputs, when the file merger generates the merged target file, the merged target file to outside of the computer via the communication device, as the file based on the target file.

The file format converter 25C converts, when the file format of the target file is not a specific file format, the file format of such target file into the specific file format, thereby generating a converted file. The file merger 25D generates a merged target file, by merging the information file with the target file, when the file format of the target file is the specific file format, and generates a merged converted file by merging the information file with the converted file, when the file format of the target file is not the specific file format.

The compressed file generator 25E generates a compressed file by compressing the target file and the information file, when the file format of the target file is not the specific file format, and unable to be converted into the specific file format. The file outputter 25F outputs the file based on the target file, to outside of the file management system 20.

Figure 7:
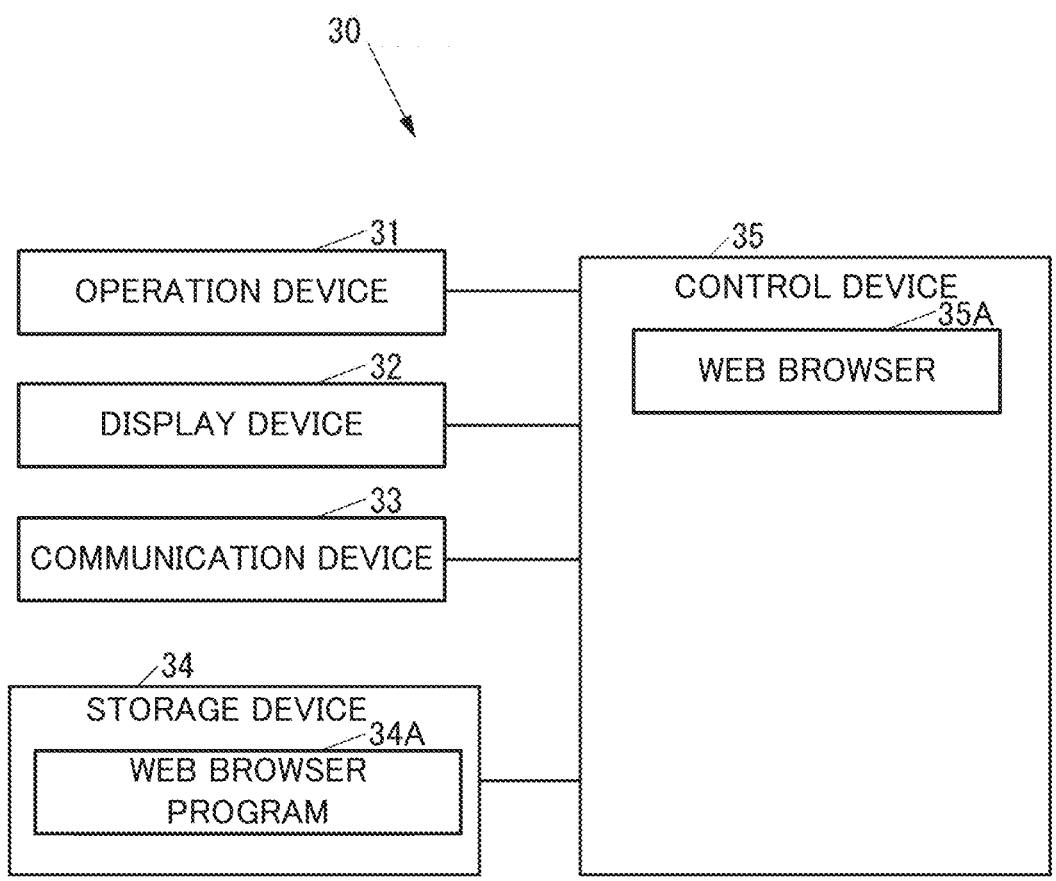
FIG. 7 is a block diagram showing a configuration of a user computer.

FIG. 7 is a block diagram showing a configuration of the user computer 30. As shown in FIG. 7, the user computer 30 includes an operation device 31, a display device 32, a communication device 33, a storage device 34, and a control device 35. The operation device 31 includes, for example, a keyboard and a mouse, with which various instructions can be inputted. The display device 32 includes, for example, an LCD that displays various types of information.

The communication device 33 performs communication with an external device via a network such as a LAN or the internet, or wired or wireless direct communication, without utilizing the network. The storage device 34 is constituted of, for example, a non-volatile memory such as a semiconductor memory or an HDD, for storing various types of information. The control device 35 controls the overall operation of the user computer 30.

The storage device 34 contains a program for the web browser (hereinafter, "web browser program") 34A. The web browser program 34A may be installed in the user computer 30, for example during the manufacturing process of the user computer 30. Instead, the web browser program 34A may be additionally installed from an external storage medium such as a USB memory, or from a network.

The control device 35 includes, for example, a CPU, a ROM containing programs and various types of data, and a RAM serving as the operation region for the CPU of the control device 35. The CPU of the control device 35 executes the programs stored in the storage device 34 or the ROM of the control device 35. The control device 35 realizes a web browser 35A, by executing a web browser program 34A.

Figure 8:
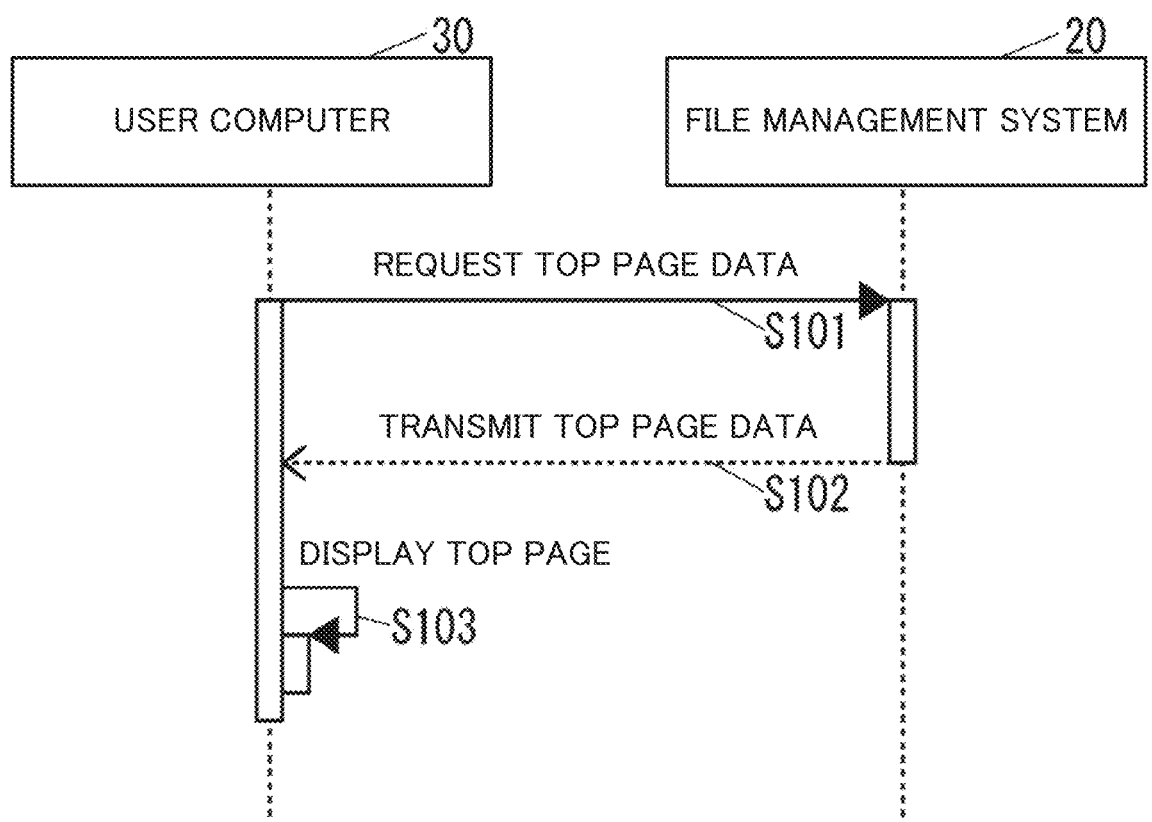
FIG. 8 is a sequence chart showing an operation of the system, performed when the user computer makes access to the file management system.

Hereunder, the operation of the file management system 20 will be described. First, the operation of the system 10, performed when the user computer makes access to the file management system 20, will be described from the viewpoint of the user operating the user computer 30. FIG. 8 is a sequence chart showing the operation of the system 10, performed when the user computer 30 makes access to the file management system 20.

The user can instruct, via the operation device 31 of the user computer 30, the web browser 35A to make access to the top page of the website of the file management system 20. Upon receipt of the instruction to make access to the top page of the website of the file management system 20, the web browser 35A requests the file management system 20 to provide the data of the top page of the website of the file management system 20, as shown in FIG. 8 (step S101).

When the web browser 35A requests the file management system 20 to provide the data of the top page of the website thereof at step S101, the file manager 25A of the file management system 20 transmits the data of the top page of the website of the file management system 20, to the web browser 35A (step S102). Upon receipt of the data transmitted at step S102, the web browser 35A causes the display device 32 to display the top page of the website of the file management system 20, according to the received data (step S103).

When the top page of the website of the file management system 20 is displayed on the display device 32, the user can make access to various web pages in the website of the file management system 20, through the top page displayed on the display device 32, by operating the operation device 31.

Figure 9:
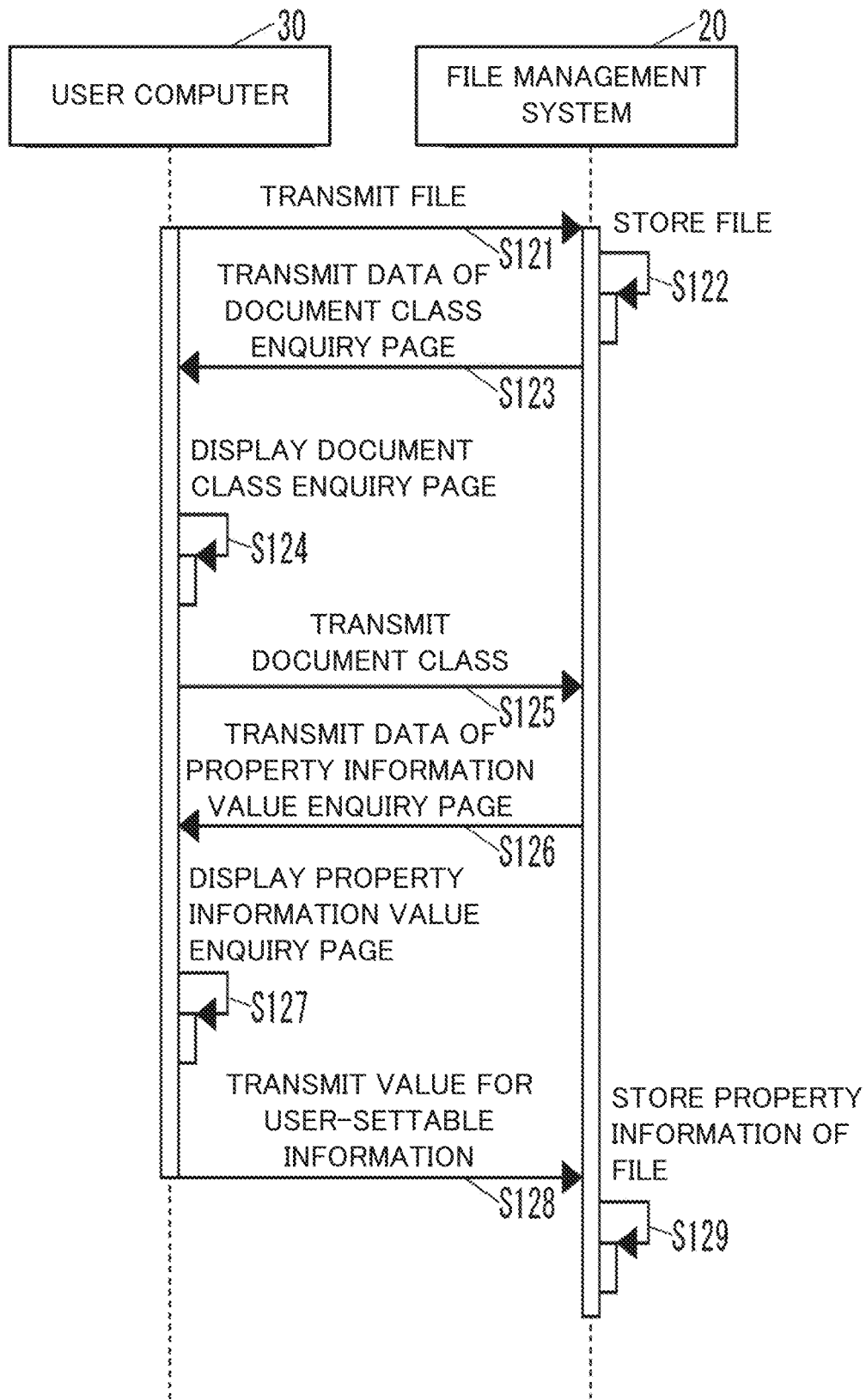
FIG. 9 is a sequence chart showing an operation of the system, performed when a file is uploaded to the file management system.

Hereunder, the operation of the system 10, performed when a file is uploaded to the file management system 20, will be described from the viewpoint of the user operating the user computer 30. FIG. 9 is a sequence chart showing the operation of the system 10, performed when the file is uploaded to the file management system 20.

While the user computer 30 is connected to the file management system 20, the user can instruct, via the operation device 31 of the user computer 30, the uploading of the file from the user computer 30 to the file management system 20, on the website of the file management system 20. Upon receipt of the instruction to upload the file to the file management system 20, from the user computer 30, the web browser 35A transmits the file designated by the user to the file management system 20, as shown in FIG. 9 (step S121).

Upon receipt of the file transmitted at step S121, the file manager 25A of the file management system 20 stores the received file in the storage device 24 (step S122). Then the file manager 25A transmits data of a web page for enquiring the user about the document class of the file transmitted at step S121 (hereinafter, "document class enquiry page"), to the web browser 35A (step S123).

Upon receipt of the data transmitted at step S123, the web browser 35A causes the display device 32 to display the document class enquiry page, according to the received data (step S124). The user can select the document class on the document class enquiry page displayed on the display device 32, via the operation device 31 of the user computer 30. When the document class is selected on the document class enquiry page, the web browser 35A transmits the selected document class to the file management system 20 (step S125).

Upon receipt of the document class transmitted at step S125, the file manager 25A of the file management system 20 transmits data of a web page for enquiring the user about the value of the user-settable information, specified in the property information setting information 24G with respect to the received document class (hereinafter, "property information value enquiry page"), to the web browser 35A (step S126).

Upon receipt of the data transmitted at step S126, the web browser 35A causes the display device 32 to display the property information value enquiry page, according to the received data (step S127). The user can input, via the operation device 31 of the user computer 30, the value of the user-settable information on the property information value enquiry page displayed on the display device 32. When the value of the user-settable information is inputted on the property information value enquiry page, the web browser 35A transmits the inputted value of the user-settable information, to the file management system 20 (step S128).

Upon receipt of the value of the user-settable information transmitted at step S128, the file manager 25A of the file management system 20 stores the document class transmitted at step S125, the item of the user-settable information specified in the property information setting information 24G with respect to the document class, the value of the user-settable information transmitted at step S128, and the item of the user-unsettable information specified in the property information setting information 24G with respect to the document class, in the property information database 24F as the property information about the file transmitted at step S121 (step S129).

Here, the value corresponding to the user-unsettable information in the property information database 24F is automatically inputted as necessary, by the file manager 25A. For example, the value corresponding to "workflow status" in FIG. 5 is inputted by the file manager 25A, each time the workflow status with respect to the target file, shown in FIG. 5 as the property information, makes a transition.

Hereunder, the operation of the system 10, performed when the workflow is generated with respect to the file being managed by the file management system 20, will be described from the viewpoint of the user operating the user computer 30.

When the user computer 30 is connected to the file management system 20, the user can generate the workflow with respect to the file being managed by the file manager 25A of the file management system 20, on the website of the file management system 20, via the operation device 31 of the user computer 30. When the workflow with respect to the file being managed by the file manager 25A is generated on the website of the file management system 20, the file manager 25A stores the generated workflow in the storage device 24.

Hereunder, the operation of the system 10, performed when the workflow with respect to the file being managed by the file management system 20 is executed, will be described from the viewpoint of the user operating the user computer 30. In this case, the user is the executer or approver of the task in the workflow.

When the user computer 30 is connected to the file management system 20, the user can execute the workflow with respect to the file being managed by the file manager 25A of the management system 20, on the website of the file management system 20, via the operation device 31 of the user computer 30. When the workflow with respect to the file being managed by the file manager 25A is executed on the website of the file management system 20, the file manager 25A updates the workflow history database 24D and the workflow status database 24E, according to the result of the execution.

Figure 10:
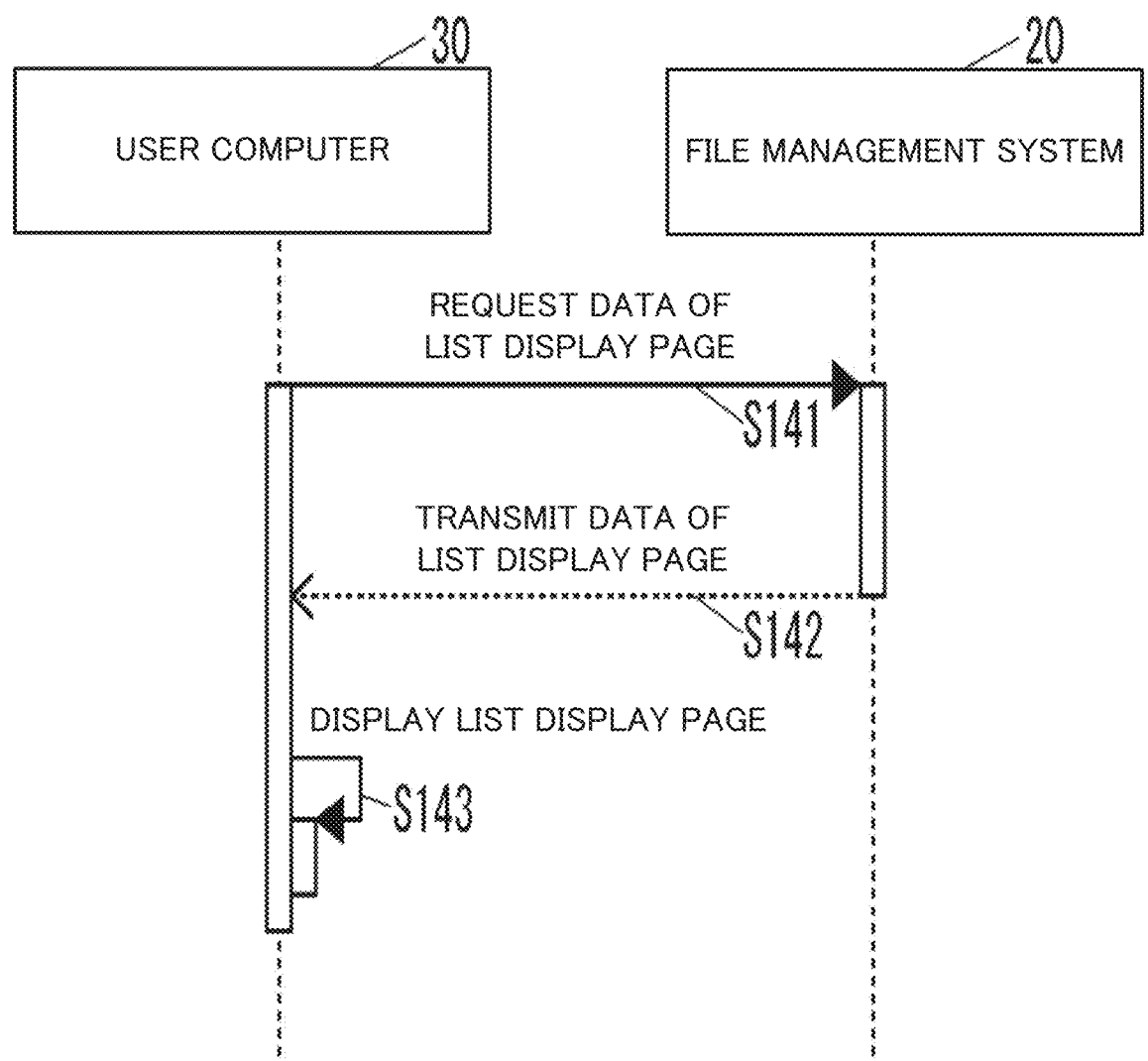
FIG. 10 is a sequence chart showing an operation of the system, performed when causing a display device of the user computer to display a list of files being managed by the file management system.

Hereunder, the operation of the system 10, performed when causing the display device 32 of the user computer 30 to display the list of the files being managed by the file management system 20, will be described from the viewpoint of the user operating the user computer 30. FIG. 10 is a sequence chart showing the operation of the system 10, performed when causing the display device 32 of the user computer 30 to display the list of the files being managed by the file management system.

When the user computer 30 is connected to the file management system 20, the user can instruct the user computer 30 to make access to a web page for displaying the list of the files being managed by the file management system 20 (hereinafter, "list display page"), on the website of the file management system 20, via the operation device 31 of the user computer 30. Upon receipt of the instruction to make access to the list display page, the web browser 35A requests the file manager 25A to provide the data of the list display page, as shown in FIG. 10 (step S141).

Upon receipt of the request for the data of the list display page from the web browser 35A at step S141, the file manager 25A transmits the data of the list display page to the web browser 35A (step S142). Upon receipt of the data transmitted at step S142, the web browser 35A causes the display device 32 to display the list display page, according to the received data (step S143).

Figure 11:
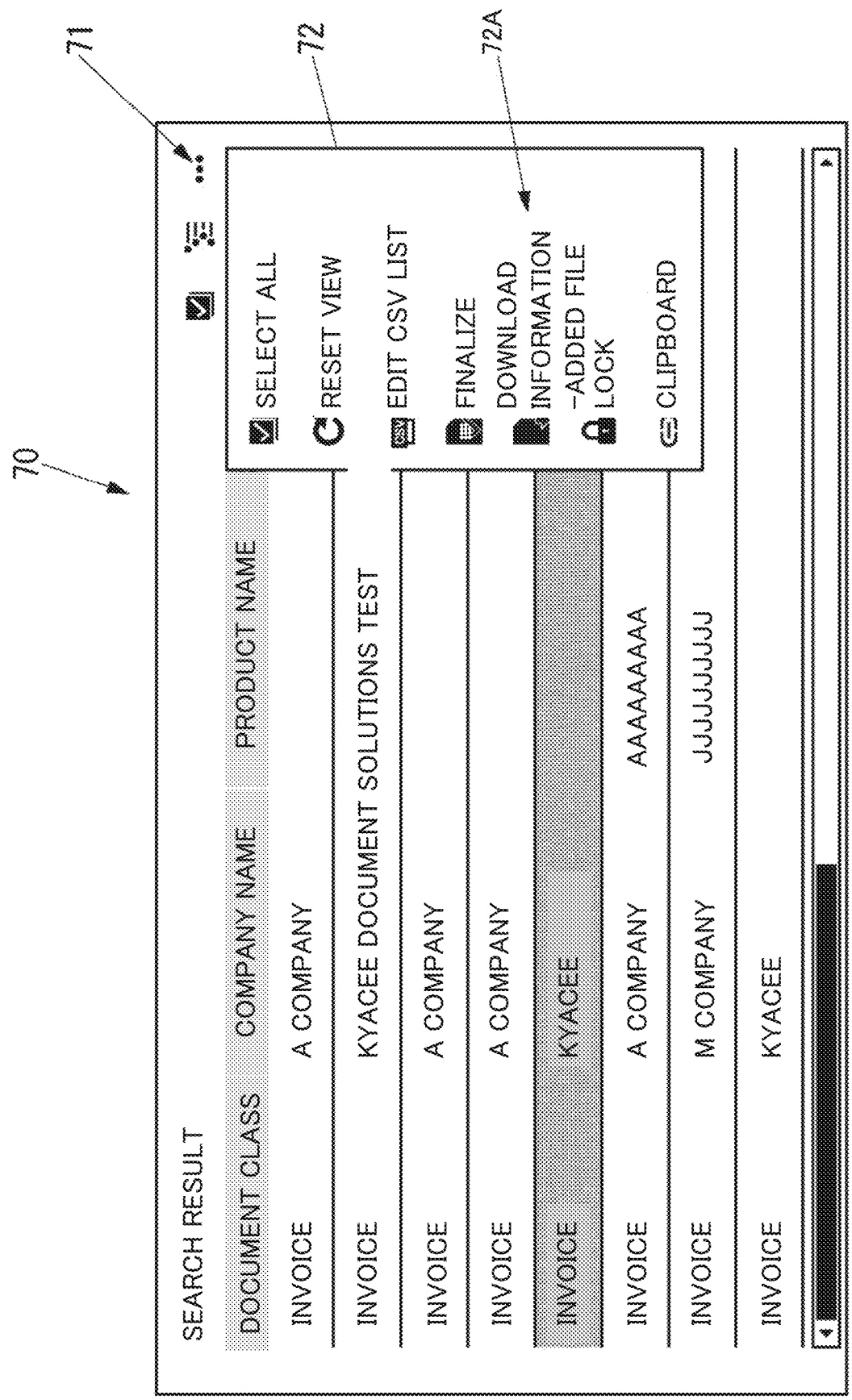
FIG. 11 is a schematic drawing showing an example of a list display page.

FIG. 11 illustrates an example of the list display page 70. As shown in FIG. 11, list display page 70 exhibits the files being managed by the file manager 25A of the file management system 20, on each line. The list display page 70 represents the property information such as "document class", "company name", and "product name", with respect to each of the files. The list display page 70 also represents the workflow status, with respect to each of the files.

The file manager 25A can retrieve the files being managed by the file manager 25A, according to a search condition inputted by the user with respect to the list display page 70, and display the retrieved files on the list display page 70. The user can select, through the operation device 31, at least one file out of the list displayed on the list display page 70. When a menu button is pressed after at least one file is selected on the list display page 70, the file manager 25A displays an information-added file download button 72A for instructing the downloading of the information-added file, on a menu 72.

When a menu button 71 is pressed, without any file having been selected on the list display page 70, the file manager 25A does not display the information-added file download button 72A on the menu 72. Although a plurality of files are selected on the list display page 70, the file manager 25A does not display the information-added file download button 72A on the menu 72, when the plurality of files that have been selected include a plurality of files, the document class of which is different from each other.

Figure 12:
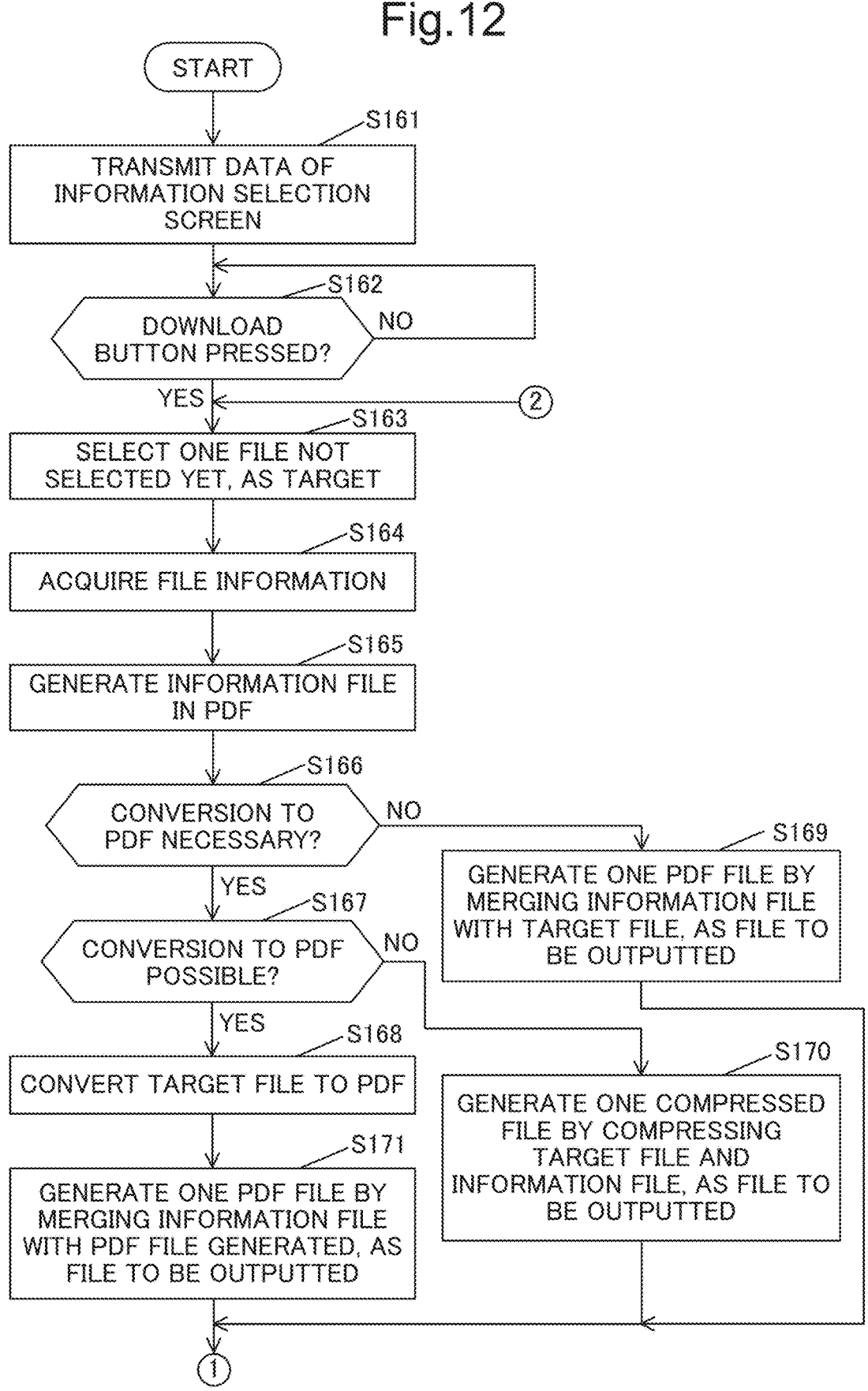
FIG. 12 and FIG. 13 are flowcharts each showing an operation of the file management system, performed when an information-added file download button is pressed.
Figure 13:
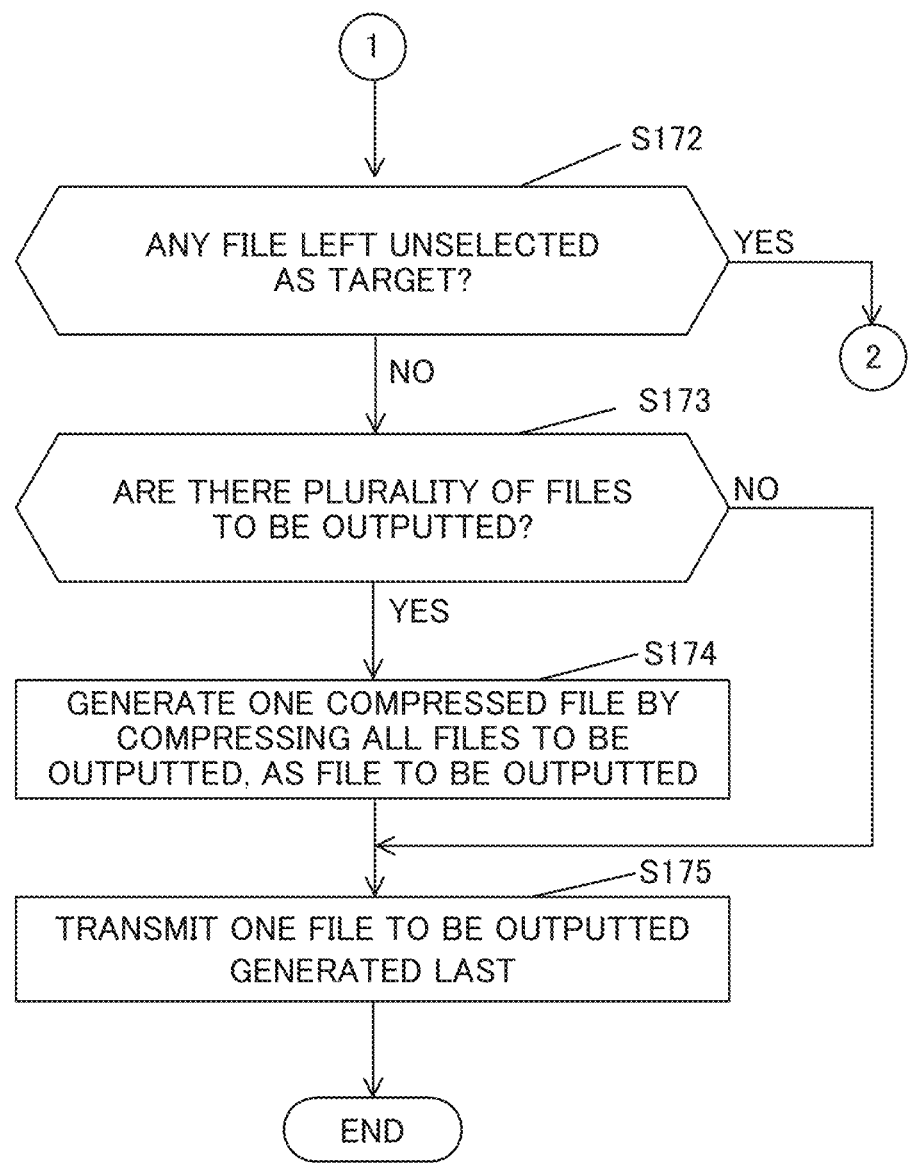

Hereunder, the operation of the file management system 20, performed when the information-added file download button 72A is pressed, will be described. FIG. 12 and FIG. 13 are flowcharts each showing the operation of the file management system 20, performed when the information-added file download button 72A is pressed (hereinafter, "output file generation process"). FIG. 14 illustrates an example of an information selection screen 80.

Referring to FIG. 12 and FIG. 13, when the information-added file download button 72A is pressed, the information file generator 25B transmits data of the information selection screen, for selecting the type of the file information, added to the files selected on the list display page 70 at the time that the information-added file download button 72A has been pressed, to the web browser 35A (step S161).

Upon receipt of the data transmitted at step S161, the web browser 35A causes the display device 32 to display the information selection screen 80 shown in FIG. 14, according to the received data. The information selection screen 80 includes checkboxes 81A to 81H for selecting each property of the property information, a checkbox 82 for selecting the workflow status, a checkbox 83 for selecting the workflow history, and a download button 84 for starting the downloading.

The information file generator 25B determines the default check status with respect to the checkboxes 81A to 81H, 82, and 83 on the information selection screen 80, according to the setting indicated by the default check status information 24I. The information file generator 25B allows the download button 84 to be pressed, only when at least one of the checkboxes 81A to 81H, 82, and 83 on the information selection screen 80 is checked.

After step S161, the information file generator 25B repeats deciding that the download button 84 on the information selection screen 80 has not been pressed, until the download button 84 is pressed (NO at step S162). Upon deciding that the download button 84 has been pressed (YES at step S162), the information file generator 25B selects only one file, not yet selected as target in the current output file generation process, out of the files selected on the list display page 70 at the time that the information-added file download button 72A was pressed, as the target file (step S163).

Then the information file generator 25B acquires the file information of the target file, from the workflow history database 24D, the workflow status database 24E, and the property information database 24F (step S164). The information file generator 25B acquires only the file information of the items corresponding to the checkboxes that were checked on the information selection screen 80, at the time that the download button 84 was pressed.

The information file generator 25B generates the information file, which is a document file representing the file information acquired at step S164, in the file format indicated by the file format information 24H, in other words in PDF (step S165). Thus, the information file generator 25B generates the PDF file containing the character data representing the file information acquired at step S164.

FIG. 15 illustrates an example of a document 150, contained in the information file generated at step S165. As shown in FIG. 15, the document 150 includes the property information 151, the workflow status 152, and the workflow history 153. The document 150 specifically represents the workflow status 152 and the workflow history 153. However, in the case where the workflow has not been generated with respect to the target file, the information file generator 25B generates an information file notifying that the workflow information is unavailable, at step S165.

After step S165, the file format converter 25C decides whether it is necessary to convert the file format of the target file to the file format indicated by the file format information 24H, in other words to PDF (step S166). The file format converter 25C decides that the file format of the target file has to be converted to PDF, for example when the file format of the target file is not PDF. When the file format of the target file is PDF, in contrast, the file format converter 25C decides that it is not necessary to convert the file format of the target file to PDF.

Upon deciding that the file format of the target file has to be converted to PDF (YES at step S166), the file format converter 25C decides whether it is possible to convert the file format of the target file to the file format indicated by the file format information 24H, in other words to PDF (step S167). When the target file is a document file such as a file of Microsoft Word, or a file of Microsoft Excel, the file format converter 25C decides that the file format of the target file can be converted to PDF. In contrast, when the target file is a file other than the document file, for example a compressed file such as a ZIP file, or a movie file such as an MP4 file, the file format converter 25C decides that the file format of the target file is unable to be converted to PDF.

Upon deciding that the file format of the target file can be converted to PDF (YES at step S167), the file format converter 25C generates the PDF file, converted from the original file format of the target file (step S168). Thus, the file format converter 25C generates the PDF file containing the character data representing the document in the target file. Here, the operation of the file format converter 25C performed at step S168 does not alter the file itself being managed by the file manager 25A. In other words, the PDF file newly generated at step S168 is a file independent from the file being managed by the file manager 25A.

When the file format converter 25C decides that it is not necessary to convert the file format of the target file to PDF (NO at step S166), the file merger 25D generates one PDF file, which is a merged target file formed by merging the information file generated at the immediately preceding step S165 with the target file, in other words an information-added file, as a file to be outputted (step S169).

The file merger 25D may merge the information file generated at the immediately preceding step S165, with any page of the target file. For example, the file merger 25D may merge the information file generated at the immediately preceding step S165, with the last page of the target file. Here, the operation of the file merger 25D performed at step S169 does not alter the file itself being managed by the file manager 25A. In other words, the PDF file newly generated at step S169 is a file independent from the file being managed by the file manager 25A.

When the file format converter 25C decides that the file format of the target file is unable to be converted to PDF (NO at step S167), the compressed file generator 25E generates one compressed file, by compressing the target file and the information file generated at the immediately preceding step S165, as a file to be outputted (step S170). For example, the compressed file generator 25E generates a ZIP file at step S170. Here, the operation of the compressed file generator 25E performed at step S170 does not alter the file itself being managed by the file manager 25A. In other words, the compressed file newly generated at step S170 is a file independent from the file being managed by the file manager 25A.

The file merger 25D generates one PDF file, which is a merged converted file formed by merging the information file generated at the immediately preceding step S165, with the PDF file generated at step S168, in other words the information-added file, as a file to be outputted (step S171). The file merger 25D may merge the information file generated at the immediately preceding step S165, with any page of the PDF file generated at step S168. For example, the file merger 25D may merge the information file generated at the immediately preceding step S165, with the last page of the PDF file generated at step S168.

After going through steps S169 to step S171, the information file generator 25B decides whether any of the files have not been selected as target in the current output file generation process, out of the files selected on the list display page 70 at the time that the information-added file download button 72A was pressed (step S172). Upon deciding that one or more files have not been selected as target (YES at step S172), the information file generator 25B performs the operation of step S163.

When the information file generator 25B decides that there is no file that has not been selected as target (NO at step S172), the compressed file generator 25E decides whether a plurality of files to be outputted have been generated, in the current output file generation process (step S173). Upon deciding that there are a plurality of files to be outputted (YES at step S173), the compressed file generator 25E generates one compressed file, by compressing all the files to be outputted generated through the current output file generation process, as a final file to be outputted (step S174). For example, the compressed file generator 25E generates a ZIP file at step S174.

When the compressed file generator 25E decides that one file to be outputted has been generated, instead of a plurality of files (NO at step S173), or finishes the operation of step S174, the file outputter 25F transmits the one file to be outputted, finally generated through the current output file generation process, to the web browser 35A (step S175), and finishes the current output file generation process. The web browser 35A can download the file transmitted from the file outputter 25F at step S175.

Here, all the files generated through the output file generation process shown in FIG. 12 and FIG. 13 are not the object of the management by the file management system 20. The file outputter 25F deletes all the files generated through the output file generation process from the file management system 20, after finishing the output file generation process. Therefore, the file management system 20 can prevent the remaining storage capacity of the storage device 24 from being reduced by the files generated through the output file generation process.

Now, in the case of the aforementioned existing document management system, when a document file is outputted to outside of the document management system, the user has to manage, not only the document file outputted from the document management system, but also the download summary outputted from the document management system.

With the arrangement according to the foregoing embodiment, in contrast, when the file format of the target file is PDF (NO at step S166), the file management system 20 generates one PDF file by merging the information file with the target file (step S169), and outputs the generated PDF file to outside of the file management system 20, for example via the communication device 23 (step S175). Accordingly, the user does not have to manage the target file and the information file separately from each other, outside of the file management system 20. Therefore, the burden of the management of the outputted file imposed on the user can be alleviated, compared with the case of the existing document management system. For example, also when the outputted file is managed in a system outside of the file management system 20, the file management system 20 can alleviate the burden of management on the user.

According to the foregoing embodiment, when the file format of the target file is not PDF (YES at step S166), the file management system 20 generates the converted file by converting the file format of the target file to PDF (step S168), generates one PDF file by merging the information file with the converted file (step S171), and outputs the PDF file thus generated to outside of the file management system 20 (step S175). Accordingly, the user does not have to manage the target file and the information file separately from each other, outside of the file management system 20. Therefore, the burden of the management of the outputted file imposed on the user can be alleviated, compared with the case of the existing document management system.

According to the foregoing embodiment, when the file format of the target file is not PDF (YES at step S166), and when the file format of the target file is unable to be converted to PDF (NO at step S167), the file management system 20 generates the compressed file by compressing the target file and the information file (step S170), and outputs the compressed file thus generated to outside of the file management system 20 (step S175). Accordingly, the user can collectively manage the target file and the corresponding information file, outside of the file management system 20. Therefore, the burden of the management of the outputted file imposed on the user can be alleviated, compared with the case of the existing document management system.

According to the foregoing embodiment, the file management system 20 generates the information file (step S165), the converted file (step S168), the merged target file (step S169), the compressed file (step S170), and the merged converted file (step S171), when the information-added file download button 72A is pressed, in other words when a predetermined condition, for outputting the file based on the target file to outside of the file management system 20, is satisfied. Therefore, the remaining storage capacity in the storage device 24 can be exempted from being reduced, compared with the case of generating the mentioned files in advance, when the condition that the information-added file download button 72A is pressed has not been satisfied.

According to the foregoing embodiment, as shown in FIG. 12 and FIG. 13, when generating the file to be outputted by merging the information file with the converted file (step S171), the file management system 20 converts the file format of the target file (step S168), after generating the information file (step S165). Instead, the file management system 20 may generate the information file, after converting the file format of the target file.

According to the foregoing embodiment, the file management system 20 outputs the files such as the information-added file based on the target file, to outside of the file management system 20 (step S175), when the condition that the information-added file download button 72A is pressed has been satisfied. However, the file management system 20 may adopt a condition other than the condition that the information-added file download button 72A is pressed, as the predetermined condition for outputting the file based on the target file to outside of the file management system 20. For example, the file management system 20 may output the files such as the information-added file based on the target file, to outside of the file management system 20, when the condition that the workflow generated with respect to the target file is completed has been satisfied.

According to the foregoing embodiment, the file management system 20 transmits the file based on the target file, directly to the user computer 30 (step S175). Instead, the file management system 20 may output the file based on the target file to outside of the file management system 20, by a different method from the direct transmission to the user computer 30. For example, the file management system 20 may output the file based on the target file to outside of the file management system 20, by e-mail, or transmission through a social networking service (SNS).

According to the foregoing embodiment, the file management system 20 transmits and receives various types of information, to and from the user computer 30, through the web browser 35A of the user computer 30. However, when an exclusive application program for utilizing the file management system 20 is installed in the user computer 30, the file management system 20 may transmit and receive various types of information to and from the user computer 30, via such application program.

According to the foregoing embodiment, the file management system 20 is storing various types of information in the storage device 24, in other words the internal storage in the file management system 20. However, the file management system 20 may store the information in at least one of an external storage of the management system 20 and a network storage, in addition to, or instead of, the internal storage in the file management system 20.

While the present disclosure has been described in detail with reference to the embodiments thereof, it would be apparent to those skilled in the art the various changes and modifications may be made therein within the scope defined by the appended claims.

What is claimed is:

1. A computer-readable, non-transitory recording medium having a file management program stored therein, the file management program being configured to cause a computer including a communication device that communicates with an external device, a processor, and a storage device that stores property information, a workflow status, and a workflow history for each of various files, to act, when the processor executes the file management program, as
 a file manager that manages the various files;
 a file outputter that outputs a file based on a target file among the various files, to outside of the computer via the communication device;
 an information file generator that generates an information file which is a document file containing information, which including at least one of the property information, the workflow status, and the workflow history, linked with the target file; and
 a file merger that generates a merged target file, by merging the information file with the target file, when the target file is of a specific file format,
 the file outputter being configured to output the merged target file to outside of the computer via the communication device, as the file based on the target file, when the file merger generates the merged target file.

2. The non-transitory recording medium according to claim 1,
 wherein the file merger generates the merged target file, when a predetermined condition that allows the file outputter to output the file based on the target file to outside of the computer is satisfied.

3. The non-transitory recording medium according to claim 1,
 wherein the file management program further causes the computer to act as a file format converter that generates a converted file by converting a file format of the target file to the specific file format, when the file format of the target file is not the specific file format,
 the file merger generates a merged converted file by merging the information file with the converted file, and
 the file outputter outputs the merged converted file to outside of the computer as the file based on the target file, when the file merger generates the merged converted file.

4. The non-transitory recording medium according to claim 3,
 wherein the file merger generates the merged converted file, when a predetermined condition that allows the file outputter to output the file based on the target file to outside of the computer is satisfied.

5. The non-transitory recording medium according to claim 4,
 wherein the file format converter generates the converted file, when the predetermined condition is satisfied.

6. The non-transitory recording medium according to claim 1,
 wherein the file management program further causes the computer to act as a compressed file generator that generates a compressed file by compressing the target file and the information file, when the file format of the target file is not the specific file format, and the file format of the target file is unable to be converted to the specific file format, and
 the file outputter outputs the compressed file to outside of the computer, as the file based on the target file, when the compressed file generator generates the compressed file.

7. The non-transitory recording medium according to claim 6,
 wherein the compressed file generator generates the compressed file, when a predetermined condition that allows the file outputter to output the file based on the target file to outside of the computer is satisfied.

8. The non-transitory recording medium according to claim 1,
 wherein the information file generator generates the information file, when a predetermined condition that allows the file outputter to output the file based on the target file to outside of the computer is satisfied.

9. The non-transitory recording medium according to claim 6,
 wherein the file merger specifies in advance one of a condition that a predetermined button has been pressed, and a condition that a workflow with respect to the target file has been completed, as the predetermined condition.

10. A file management system comprising:
 a communication device that communicates with an external device;
 a storage device that stores property information, a workflow status, and a workflow history for each of various files; and
 a control device including a processor, and configured to act, when the processor executes a control program, as:
  a file manager that manages the various files;
  a file outputter that outputs a file based on a target file among the various files, to outside of the computer via the communication device;
  an information file generator that generates an information file which is a document file containing information, which including at least one of the property information, the workflow status, and the workflow history, linked with the target file; and
  a file merger that generates a merged target file, by merging the information file with the target file, when the target file is of a specific file format,
  the file outputter being configured to output the merged target file to outside of the computer via the communication device, as the file based on the target file, when the file merger generates the merged target file.

* * * * *